United States Patent [19]

Ogasahara et al.

[11] Patent Number: 5,116,628
[45] Date of Patent: May 26, 1992

[54] PROCESS FOR PRODUCING LIQUID EGG HAVING REDUCED CHOLESTEROL CONTENT

[75] Inventors: Johji Ogasahara, Osaka; Hitoshi Hariu, Kyoto; Masakazu Takahashi, Hyogo, all of Japan

[73] Assignees: Sumitomo Seika Chemicals Co., Ltd., Hyogo; Otsuka Foods Co., Ltd., Osaka; Mitsubishi Corporation, Tokyo, all of Japan

[21] Appl. No.: 599,840

[22] Filed: Oct. 19, 1990

[30] Foreign Application Priority Data

Oct. 30, 1989 [JP] Japan ................... 1-282217

[51] Int. Cl.$^5$ ................................ A23L 1/32
[52] U.S. Cl. .................. 426/330.1; 426/425; 426/475; 426/490; 426/614
[58] Field of Search ............ 426/330.1, 474, 475, 426/490, 614, 425, 478

[56] References Cited

U.S. PATENT DOCUMENTS

| | | | |
|---|---|---|---|
| 3,563,765 | 8/1967 | Melnick | 426/614 |
| 3,717,474 | 2/1973 | Fioriti | 426/614 |
| 3,862,343 | 1/1975 | Breuking | 426/614 |
| 4,145,455 | 3/1979 | Fujimaki | 426/614 |
| 4,234,619 | 11/1980 | Yano | 426/490 |
| 4,333,959 | 6/1982 | Bracco | 426/490 |
| 5,024,846 | 6/1991 | McLachlan | 426/478 |
| 5,028,449 | 7/1991 | Hatanaka | 426/614 |
| 5,037,661 | 8/1991 | Merchant | 426/614 |

FOREIGN PATENT DOCUMENTS

| | | |
|---|---|---|
| 0344123 | 11/1989 | European Pat. Off. |
| 3734025 | 4/1989 | Fed. Rep. of Germany |
| 59-135847 | 8/1984 | Japan |
| 135847 | 8/1984 | Japan |
| 227743 | 10/1986 | Japan |
| 134042 | 6/1987 | Japan |

OTHER PUBLICATIONS

Patent Abstracts of Japan, vol. 8, No. 255, JP-A-59 135 847.
Patent Abstracts of Japan, vol. 10, No. 245, JP-A-61 74 548.
Patent Abstracts of Japan, vol. 10, No. 94, JP-A-60 224 695.

*Primary Examiner*—Carolyn Paden
*Attorney, Agent, or Firm*—Jones, Tullar & Cooper

[57] ABSTRACT

A process for producing liquid egg having a reduced cholesterol content having flavor and taste comparable to conventional liquid egg having a normal cholesterol content is disclosed. The liquid egg having a reduced cholesterol content is produced by contacting liquid egg with a supercritical fluid to extract cholesterol from the liquid egg. Food whose raw material is the liquid egg having a reduced cholesterol content produced by the above process is also disclosed, as well as a new use for a wetted wall column system for producing the liquid egg noted above.

9 Claims, No Drawings

PROCESS FOR PRODUCING LIQUID EGG HAVING REDUCED CHOLESTEROL CONTENT

FIELD OF THE INVENTION

The present invention relates to a process for producing liquid egg having a reduced cholesterol content and food containing the liquid egg thus produced.

BACKGROUND OF THE INVENTION

Demand for food having a low cholesterol content has been increased not only as a diet for treating patients with arteriosclerosis, but also as health food for normal healthy people. In this respect, although eggs are excellent food, they contain a large amount of cholesterol. Therefore, it is requested to reduce the cholesterol content of eggs.

As means for reducing a cholesterol content of food, direct extraction of cholesterol with various solvents has been proposed. For example, solid-liquid extraction of cholesterol contained in liquid or powdered egg with an organic solvent has been known. Examples of this extraction are disclosed in Japanese Patent Kokoku No. 46-42944 and Japanese Patent Kokai No. 47-19062. However, there are various disadvantages in the above extraction with an organic solvent. For example, since cholesterol is normally extracted together with other fats and oils, the resulting food product has a very low fat and oil content. Particularly, in liquid or powdered egg, triglycerides, pigments and the like are extracted together with cholesterol and, therefore, its characteristic flavor is lost, which results in deterioration of its commercial value. Further, there is the possibility that a remaining solvent influences on the human body. Therefore, it is hardly at best questionable to say that the above extraction is suitable for practical use.

Japanese Patent Kokoku No. 62-51092 proposes a process for removing cholesterol from powdered egg by contacting powder egg with supercritical $CO_2$. However, since powdered egg itself has extremely inferior flavor in comparison with that of liquid egg, there is a disadvantage that the use of the resulting egg product is limited.

Heretofore, extraction of various organic materials with a supercritical fluid has been known and practical examples thereof include decaffeination of coffee, extraction of hop extract and the like. However, it has been considered that extraction with a supercritical fluid would be ineffective for extraction of a substance from a material containing a large amount of water such as liquid egg.

OBJECTS OF THE INVENTION

Under these circumstances, the present inventors have intensively studied a process for reducing a cholesterol content of liquid egg without deterioration of flavor thereof. As a result, it has been unexpectedly found that extraction with a supercritical fluid is applicable for reducing a cholesterol content of liquid egg.

That is, one object of the present invention is to provide a process for producing liquid egg having a reduced cholesterol content.

Another object of the present invention is to provide a food containing the liquid egg thus produced.

These objects as well as other objects and advantages of the present invention will become apparent to those skilled in the art from the following description.

SUMMARY OF THE INVENTION

According to the present invention, there is provided a process for producing liquid egg having a reduced cholesterol content which comprises contacting liquid egg with a supercritical fluid to extract cholesterol from the liquid egg. The present invention also provides food whose raw material is liquid egg having a reduced cholesterol content produced by the above process.

DETAILED DESCRIPTION OF THE INVENTION

Liquid egg to be used as a raw material in the process of the present invention may be either liquid whole egg or liquid egg yolk, or a mixture thereof. Liquid egg may be any commercially available one and, frozen liquid egg can also be used by thawing it.

As the supercritical fluid, $CO_2$, $N_2O$, ethane, propane and the like can be used in the present invention, but $CO_2$ is preferred in view of safety of food. In the present invention, "supercritical $CO_2$" used as the extraction solvent of cholesterol is defined as $CO_2$ in a state above its critical point, i.e., at about 31° C. under the pressure of 72 kg/cm$^2$, upon conducting extraction. Particularly, $CO_2$ at a temperature of 32° to 47° C. and at a pressure of 120 to 270 kg/cm$^2$ is preferred in the present invention.

For conducting the process of the present invention, liquid egg is brought into contact with the supercritical fluid in a wetted wall column system rather than a normal packed column system because, when the latter system is employed, liquid egg is bubbled, which makes the operation difficult. By selecting the above conditions, it becomes possible to extract cholesterol from liquid egg which contains a large amount of water.

On the other hand, other fatty ingredients are also contained in an extract in addition to cholesterol, and main components of the other fatty ingredients are neutral fats and the like which have a large influence on flavor and taste. Accordingly, in the separation of the extract, it is preferred to selectively separate a fraction containing a large amount of cholesterol at a first stage under the conditions of a pressure of 50 to 200 kg/cm$^2$ and a temperature of not less than 40° C., followed by recovering a fraction which contains the other fatty ingredients as the main components at a second stage by changing the conditions, normally, at a pressure lower than that of the first stage separation, preferably not more than 70 kg/cm$^2$ and at a temperature of 30° to 60° C. Preferably, the amount of cholesterol in the first stage fraction is in the range of 5 to 75%, and the amount of cholesterol in the second stage fraction is up to several %. The main components of the second stage fraction are other fatty ingredients.

Then, if the second stage fraction is returned to liquid egg to be used as a raw material of the extraction, flow of liquid egg along the wetted wall column is improved. Further, if it is added to the resulting liquid egg having a reduced cholesterol content, flavor and taste can be further improved. Accordingly, in the present invention, a part or all of the second stage fraction can be re-used for either or both of the above purposes.

According to the process of the present invention, 50% or more of cholesterol contained in liquid egg used as a raw material is removed. However, the resulting liquid egg having a reduced cholesterol content of the present invention has good taste and flavor comparable to fresh eggs and can be used as it is, or it can be frozen for storage. Further, it can be dried by a conventional drying method such as freeze drying, vacuum drying, spray drying, drum drying or the like to use as a raw material for other food products.

The liquid egg of the present invention can be used according to the same manner as that for fresh eggs and conventional egg products. Further, the liquid egg of the present invention can be used together with fresh eggs and/or conventional egg products.

For example, the liquid egg of the present invention can be used for preparing various dishes such as scrambled egg, egg soup, egg with bacon, omelet, thick custard soup, coating for fried food and the like. Further, the liquid egg of the present invention can be used as a raw material for various food products such as mayonnaise, egg custard, bread, biscuits, crackers, cakes, cookies, pies, ice cream, noodle, pasta, confectionary, drink and the like.

As described hereinabove, according to the present invention, the liquid egg having a reduced choresterol content can be obtained without deterioration of flavor and taste and, thereby, a diet for treating patients with hypercholesterolemia as well as health food for normal healthy people.

The following Examples further illustrate the present invention in detail, but are not to be construed to limit the scope thereof.

EXAMPLE 1

Liquid egg yolk 1 kg of which had the cholesterol content of 1.2% and was obtained by thawing commercially available frozen liquid egg, was fed into a wetted wall column of 30 mm in inner diameter and 1500 mm in length from the top thereof, and $CO_2$ at the temperature of 35° C. and the pressure of 200 kg/cm$^2$ was introduced into the wetted wall column from its bottom to bring $CO_2$ into contact with liquid egg to conduct extraction. The $CO_2$ containing the extract effused from the top was firstly subjected to a first stage separation in a separator maintained at the temperature of 35° C. and the pressure of 150 kg/cm$^2$ and, then, it was further subjected to a second stage separation in a separator maintained at the temperature of 45° C. and the pressure of 50 kg/cm$^2$.

In the first stage separation, a fraction of 13 g was recovered and, in the second stage separation, a fraction of 126 g was recovered. On the other hand, liquid egg yolk of 826 g was recovered from the bottom of the wetted wall column.

As the result of analysis, it was found that the fraction recovered in the first stage separation contained cholesterol of 45.0% and the amount of cholesterol in the liquid egg yolk recovered from the bottom was 0.36%. The removal ratio of cholesterol was 75.0%.

The fraction recovered at the second stage separation was admixed with the liquid egg yolk recovered from the bottom to obtain the desired liquid egg yolk having the cholesterol content of 0.64%.

When the liquid egg yolk thus obtained was admixed with commercially available liquid egg white so that the composition of the resulting mixture was the same as that of fresh egg and scrambled egg was prepared by using the mixture. As a result, no difference in flavor and taste was found between the scrambled egg thus prepared and that prepared by using fresh egg.

EXAMPLE 2

According to the same manner as that described in Example 1, a fraction of 9 g was recovered from a first stage separation and a fraction of 86 g was recovered from a second stage separation except that liquid whole egg 1.5 kg which had the cholesterol content of 0.4% was used instead of liquid egg yolk.

As the result of analysis, it was found that the fraction recovered from the first stage separation contained cholesterol of 32.0 % and the amount of cholesterol in liquid whole egg recovered from the bottom was 0.13%. The removal ratio of cholesterol was 70%.

No bubbling liquid whole egg was observed during the operation. When scrambled egg was prepared by using the resulting liquid whole egg recovered from the bottom, no difference in flavor and taste was found between the scrambled egg and that prepared made from normal liquid whole egg.

EXAMPLE 3

According to the same manner as that described in Example 1, 8 kg of the desired liquid egg yolk having a reduced cholesterol content was obtained by using 10 kg of liquid egg yolk. The removal ratio of cholesterol was about 70%.

Analytical data of the liquid egg yolk used as the raw material and the resulting liquid egg having a reduced cholesterol content are shown in Table 1.

TABLE 1

| Items | Liquid egg yolk used as raw material | Liquid egg yolk having reduced cholesterol content |
|---|---|---|
| Water (%) | 50.0 | 58.9 |
| Protein (%) | 14.9 | 17.3 |
| Lipid (%) | 32.0 | 21.1 |
| Carbohydrate (%) | 0.7 | 0.8 |
| Ash (%) | 1.6 | 1.9 |
| Cholesterol (%) | 1.2 | 0.36 |

The following food was prepared by using the liquid egg yolk having a reduced cholesterol content (hereinafter referred to as low cholesterol liquid egg yolk) thus obtained.

Omelet

Liquid egg white (270 g) and small amounts of sugar and salt were added to the low cholesterol liquid egg yolk (100 g) and the mixture was mixed with a beater. The mixture was baked on a frying pan with a small amount of salad oil to prepare an omelet (omelet A). Likewise, according to the same manner, an omelet (omelet B) was prepared except that fresh eggs were used instead of the low cholesterol liquid egg yolk and liquid egg white. The cholesterol content of omelet A was about 30% of that of omelet B.

Flavor and taste of these omelets were organoleptically evaluated by 10 panelists. The results are shown in Table 2. The figures in Table 2 are the numbers of the panelists agreed to the evaluation.

TABLE 2

| Evaluation | Omelet A | Omelet B |
|---|---|---|
| Better flavor | 6 | 4 |
| Better taste | 5 | 5 |
| Better body | 2 | 8 |
| Better chewing | 4 | 6 |
| Better overall | 5 | 5 |

TABLE 2-continued

| Evaluation | Omelet A | Omelet B |
|---|---|---|
| evaluation | | |

As seen from Table 2, although omelet A had somewhat plain flavor and taste in comparison with omelet B, no inferior flavor and taste was found.

Sponge cake

A mixture of egg white (300 g) and sugar (250 g) was frothed by agitating with a beater. Separately, a mixture of the low cholesterol liquid egg yolk (400 g), sugar (250 g) and water (100 g) was frothed by agitating with a beater. The frothed latter mixture was added to the former and they were mixed. Then, low gluten wheat flour (500 g) was admixed with the resulting mixture. A small amount of vanilla essence was added and the mixture was baked in an oven to prepare a sponge cake (sponge cake A). Likewise, according the the same manner, a sponge cake (sponge cake B) was prepared except that conventional liquid egg yolk was used instead of the low cholesterol liquid egg yolk. The cholesterol content of sponge cake A was about 30% of that of sponge cake B.

Flavor and taste of these sponge cakes were evaluated according to the same manner as that described with respect to the omelet. The results are shown in Table 3.

TABLE 3

| Evaluation | Sponge cake A | Sponge cake B |
|---|---|---|
| Better flavor | 7 | 3 |
| Better taste | 6 | 4 |
| Better body | 4 | 6 |
| Better chewing | 4 | 6 |
| Better overall evaluation | 6 | 4 |

As seen from Table 3, no substantial difference in flavor and taste was found between sponge cakes A and B.

Custard pudding

Whole egg (100 g), the low cholesterol liquid egg yolk (120 g) and sugar (180 g) were mixed and milk (600 g) was added thereto with preventing bubbling. The mixture was stirred. Vanilla essence (0.5 g) and a small amount of rum were added thereto and 150 ml portions of the mixture were distributed into cups. The cups were cooked in an oven at 150° to 160° C. for 40 minutes to prepare a custard pudding (pudding A). Likewise, according to the same manner, a custard pudding (pudding B) was prepared except that conventional liquid egg yolk was used instead of the low cholesterol liquid egg yolk. The cholesterol content of pudding A was about 48% of that of pudding B.

Flavor and taste of these puddings were evaluated according to the same manner as that described with respect to the omelet. The results are shown in Table 4.

TABLE 4

| Evaluation | Pudding A | Pudding B |
|---|---|---|
| Better flavor | 6 | 4 |
| Better taste | 6 | 4 |
| Better body | 4 | 6 |
| Better chewing | 5 | 5 |
| Better overall | 6 | 4 |

TABLE 4-continued

| Evaluation | Pudding A | Pudding B |
|---|---|---|
| evaluation | | |

As seen from Table 4, no substantial difference in flavor and taste was found between puddings A and B.

Mayonnaise

According to the formulation as shown in Table 5, a mayonnaise was prepared by uniformly mixing the low cholesterol liquid egg yolk, sugar, salt, powdered mustard, pepper, paprika and one half of vinegar, adding dropwise the remaining vinegar and salad oil to the mixture with agitating to obtain an emulsified mixture and then grinding the mixture with a colloid mill for several seconds to prepare a mayonnaise (mayonnaise A). Likewise, according to the same manner, a mayonnaise (mayonnaise B) was prepared except that conventional liquid egg yolk was used instead of the low cholesterol liquid egg yolk. The cholesterol content of mayonnaise A was about 30% of that of mayonnaise B.

TABLE 5

| Ingredients | Mayonnaise A (%) | Mayonnaise B (%) |
|---|---|---|
| Conventional liquid egg yolk | — | 18.0 |
| Low cholesterol liquid egg yolk | 18.0 | — |
| Vinegar | 9.4 | 9.4 |
| Sugar | 2.2 | 2.2 |
| Salt | 1.3 | 1.3 |
| Powdered mustard | 0.9 | 0.9 |
| Pepper | 0.1 | 0.1 |
| Paprika | 0.1 | 0.1 |
| Salad oil | up to 100 | up to 100 |

Flavor and taste of these mayonnaises were evaluated according to the same manner as that with respect to the omelet. The results are shown in Table 6.

TABLE 6

| Evaluation | Mayonnaise A | Mayonnaise B |
|---|---|---|
| Better flavor | 6 | 4 |
| Better taste | 6 | 4 |
| Better body | 4 | 6 |
| Better smoothness | 5 | 5 |
| Better overall evaluation | 6 | 4 |

As seen from Table, no substantial difference in flavor and taste was found between mayonnaises A and B. When both mayonnaises were allowed to stand at 50° C. for 10 and 20 days, no substantial difference in appearance was found between mayonnaises A and B.

What is claimed is:

1. A process for producing liquid egg having a reduced cholesterol content which comprises contacting liquid egg with a supercritical fluid to extract cholesterol from the liquid egg.

2. A process for producing liquid egg having a reduced cholesterol content according to claim 1, wherein the liquid egg is liquid egg yolk or liquid whole egg.

3. A process for producing liquid egg having a reduced cholesterol content according to claim 1, wherein the supercritical fluid is $CO_2$.

4. A process for producing liquid egg having a reduced cholesterol content according to claim 1, further comprising separating extracted cholesterol and other fat ingredients from the supercritical fluid by adjusting temperature and pressure conditions so that a fraction containing cholesterol of 5 to 75% is obtained in a first stage separation, and by further adjusting temperature and pressure conditions so that a fraction containing the other fat ingredients is obtained in a second stage separation.

5. A process for producing liquid egg having a reduced cholesterol content according to claim 4, wherein liquid egg is contacted with the supercritical fluid in a wetted wall column system.

6. A process for producing liquid egg having a reduced cholesterol content according to claim 4, wherein the first stage separation is conducted under a pressure of 50 to 200 kg/cm$^2$ and a temperature of not higher than 40° C.

7. A process for producing liquid egg having a reduced cholesterol content according to claim 4, wherein the second stage separation is conducted at a pressure lower than that of the first stage separation and at a temperature of 30° to 60° C.

8. A process for producing liquid egg having a reduced cholesterol content according to claim 1, wherein liquid egg is contacted with the supercritical fluid in a wetted wall column system.

9. A wetted wall column system for use in producing liquid egg having a reduced cholesterol content, comprising bringing the liquid egg into contact with a supercritical fluid in the wetted wall column system to extract cholesterol from the liquid egg.

* * * * *